US012498925B2

(12) United States Patent  
Anderson et al.

(10) Patent No.: US 12,498,925 B2  
(45) Date of Patent: *Dec. 16, 2025

(54) REGISTER FILE STRUCTURES COMBINING VECTOR AND SCALAR DATA WITH GLOBAL AND LOCAL ACCESSES

(71) Applicant: TEXAS INSTRUMENTS INCORPORATED, Dallas, TX (US)

(72) Inventors: Timothy David Anderson, University Park, TX (US); Duc Quang Bui, Grand Prairie, TX (US); Mel Alan Phipps, Sugar Land, TX (US); Todd T. Hahn, Sugar Land, TX (US); Joseph Zbiciak, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 204 days.

This patent is subject to a terminal disclaimer.

(21) Appl. No.: 17/391,143

(22) Filed: Aug. 2, 2021

(65) Prior Publication Data

US 2021/0357219 A1 Nov. 18, 2021

Related U.S. Application Data

(63) Continuation of application No. 16/018,234, filed on Jun. 26, 2018, now Pat. No. 11,080,047, which is a continuation of application No. 14/327,066, filed on Jul. 9, 2014, now Pat. No. 10,007,518.

(60) Provisional application No. 61/844,080, filed on Jul. 9, 2013.

(51) Int. Cl.  
*G06F 9/30* (2018.01)

(52) U.S. Cl.  
CPC ...... *G06F 9/30036* (2013.01); *G06F 9/30014* (2013.01); *G06F 9/30038* (2023.08); *G06F 9/30094* (2013.01); *G06F 9/3012* (2013.01)

(58) Field of Classification Search  
None  
See application file for complete search history.

(56) References Cited

U.S. PATENT DOCUMENTS

| 5,301,340 | A | 4/1994 | Cook |
| 6,343,348 | B1 | 1/2002 | Tremblay et al. |
| 6,629,232 | B1 * | 9/2003 | Arora ................. G06F 9/30141 712/E9.071 |
| 7,484,076 | B1 * | 1/2009 | Oberman ............. G06F 9/3887 712/203 |
| 2003/0167460 | A1 | 9/2003 | Desai |
| 2005/0251644 | A1 | 11/2005 | Maher |
| 2007/0162726 | A1 | 7/2007 | Gschwind |
| 2008/0016327 | A1 * | 1/2008 | Menon ................ G06F 9/30072 712/E9.046 |
| 2014/0317627 | A1 | 10/2014 | Jin |

* cited by examiner

*Primary Examiner* — John M Lindlof  
(74) *Attorney, Agent, or Firm* — Xianghui Huang; Frank D. Cimino

(57) ABSTRACT

The number of registers required is reduced by overlapping scalar and vector registers. This allows increased compiler flexibility when mixing scalar and vector instructions. Local register read ports are reduced by restricting read access. Dedicated predicate registers reduce requirements for general registers, and allows reduction of critical timing paths by allowing the predicate registers to be placed next to the predicate unit.

20 Claims, 7 Drawing Sheets

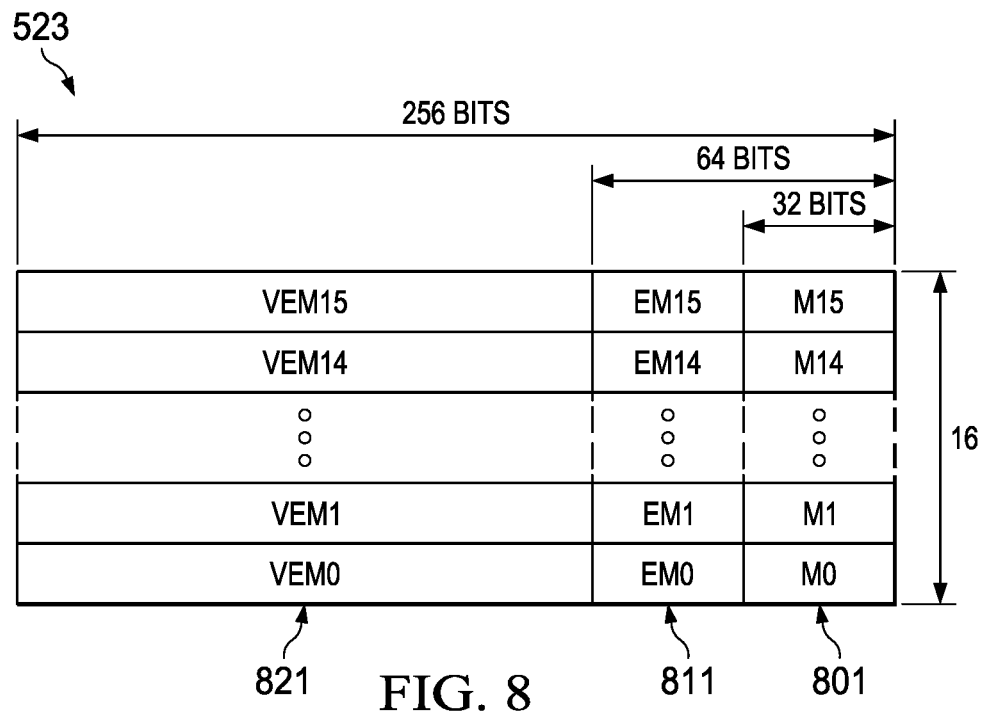
FIG. 8
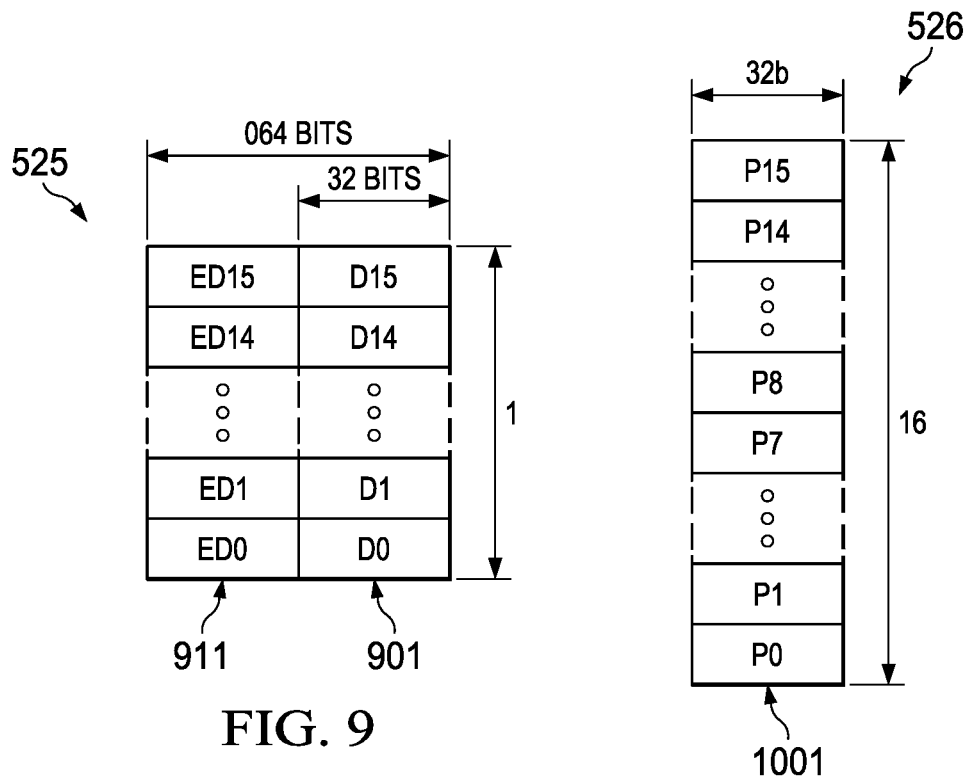
FIG. 9
FIG. 10

REGISTER FILE STRUCTURES COMBINING VECTOR AND SCALAR DATA WITH GLOBAL AND LOCAL ACCESSES

CROSS-REFERENCE TO RELATED APPLICATIONS

This application is a continuation of U.S. patent application Ser. No. 16/018,234, filed Jun. 26, 2018, which is a continuation of U.S. patent application Ser. No. 14/327,066, filed Jul. 9, 2014, now U.S. Pat. No. 10,007,518, which claims priority to U.S. Provisional Application No. 61/844,080 filed Jul. 9, 2013, each of which is incorporated by reference herein in its entirety.

TECHNICAL FIELD

The technical field of this invention is digital data processing and more specifically register file structures.

BACKGROUND

Register files are used for the temporary storage of information in digital processing systems. Register files typically provide higher performance and better area utilization for smaller memory sizes than standard embedded memory. They may contain multiple dedicated read and write ports for maximum flexibility.

SUMMARY

The invention described solves the problems arising from the use of different data path widths requiring multiple register files to accommodate the data. Scalar and vector registers are overlapped into the same register file structures for maximum efficiency. A distinction is also made between globally accessible registers which may be accessed by any functional unit, and locally accessible registers that can only be read by the owner processing unit, but can be written by all other processing units.

BRIEF DESCRIPTION OF THE DRAWINGS

These and other aspects of this invention are illustrated in the drawings, in which:

FIG. 8 illustrates a local vector register file shared by multiply and correlation functional units;

FIG. 9 illustrates a local register file of a load/store unit;

FIG. 10 illustrates a predicate register file;

DETAILED DESCRIPTION

Figure 1:
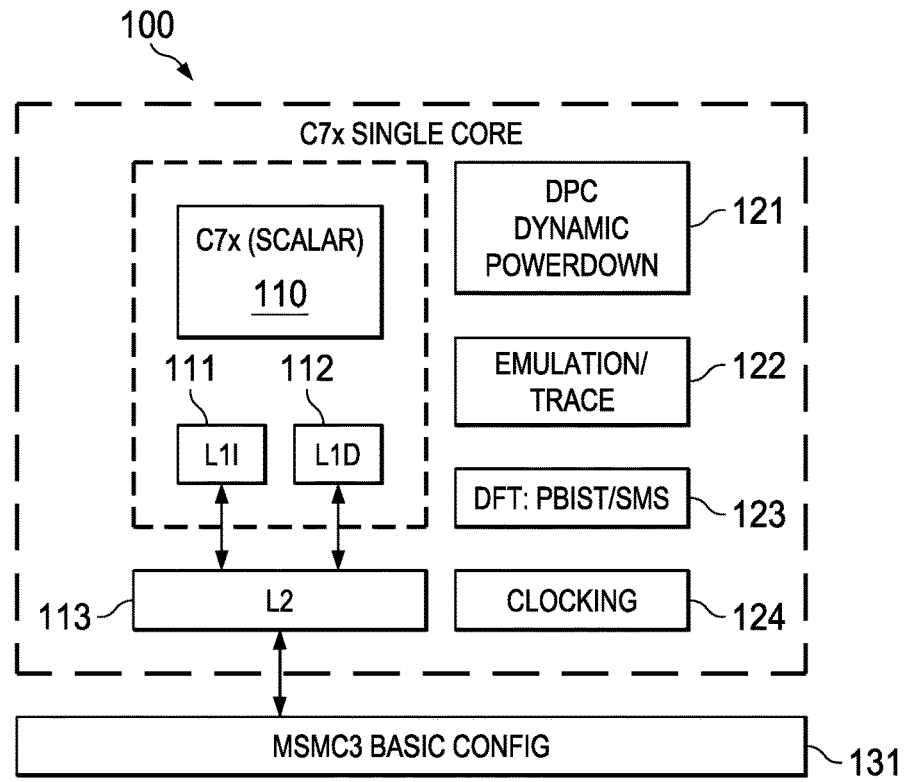
FIG. 1 illustrates a single core scalar processor according to one embodiment of this invention.

FIG. 1 illustrates a single core scalar processor according to one embodiment of this invention. Single core processor 100 includes a scalar central processing unit (CPU) 110 coupled to separate level one instruction cache (L1I) 111 and level one data cache (L1D) 112. Central processing unit core 110 could be constructed as known in the art and would typically include a register file, an integer arithmetic logic unit, an integer multiplier and program flow control units. Single core processor 100 includes a level two combined instruction/data cache (L2) 113 that holds both instructions and data. In the preferred embodiment scalar central processing unit (CPU) 110, level one instruction cache (L1I) 111, level one data cache (L1D) 112 and level two combined instruction/data cache (L2) 113 are formed on a single integrated circuit.

In one embodiment this single integrated circuit also includes auxiliary circuits such as power control circuit 121, emulation/trace circuits 122, design for test (DST) programmable built-in-self-test (PBIST) circuit 123 and clocking circuit 124. External to CPU 110 and possibly integrated on single integrated circuit 100 is memory controller 131.

CPU 110 operates under program control to perform data processing operations upon defined data. The program controlling CPU 110 consists of a plurality of instructions that must be fetched before decoding and execution. Single core processor 100 includes a number of cache memories. FIG. 1 illustrates a pair of first level caches. Level one instruction cache (L1I) 111 stores instructions used by CPU 110. CPU 110 first attempts to access any instruction from level one instruction cache 121. Level one data cache (L1D) 112 stores data used by CPU 110. CPU 110 first attempts to access any required data from level one data cache 112. The two level one caches (L1I 111 and L1D 112) are backed by a level two unified cache (L2) 113. In the event of a cache miss to level one instruction cache 111 or to level one data cache 112, the requested instruction or data is sought from level two unified cache 113. If the requested instruction or data is stored in level two unified cache 113, then it is supplied to the requesting level one cache for supply to central processing unit core 110. As is known in the art, the requested instruction or data may be simultaneously supplied to both the requesting cache and CPU 110 to speed use.

Level two unified cache 113 is further coupled to higher level memory systems via memory controller 131. Memory controller 131 handles cache misses in level two unified cache 113 by accessing external memory (not shown in FIG. 1). Memory controller 131 handles all memory centric functions such as cacheabilty determination, error detection and correction, address translation and the like. Single core processor 100 may be a part of a multiprocessor system. In that case memory controller 131 handles data transfer between processors and maintains cache coherence among processors.

Figure 2:
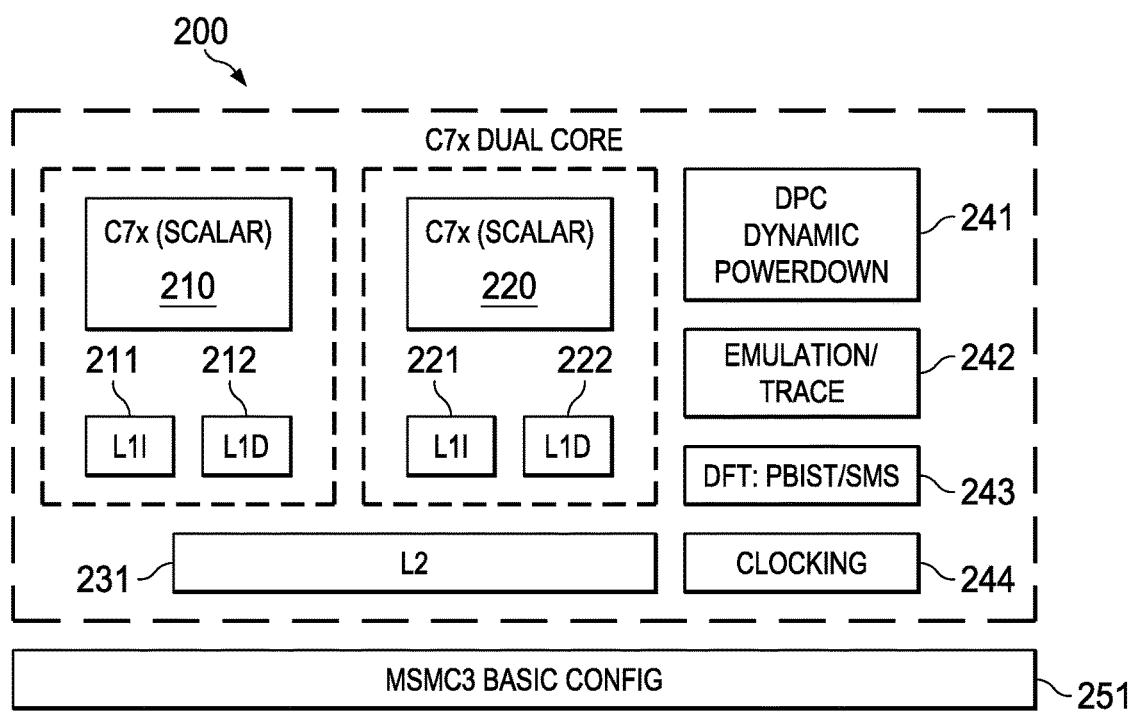
FIG. 2 illustrates a dual core scalar processor according to another embodiment of this invention.

FIG. 2 illustrates a dual core processor according to another embodiment of this invention. Dual core processor 200 includes first CPU 210 coupled to separate level one instruction cache (L1I) 211 and level one data cache (L1D) 212 and second CPU 220 coupled to separate level one instruction cache (L1I) 221 and level one data cache (L1D) 212. Central processing units 210 and 220 are preferably constructed similar to CPU 110 illustrated in FIG. 1. Dual core processor 200 includes a single shared level two combined instruction/data cache (L2) 231 supporting all four level one caches (L1I 211, L1D 212, L1I 221 and L1D 222). In the preferred embodiment CPU 210, level one instruction cache (L1I) 211, level one data cache (L1D) 212, CPU 220, level one instruction cache (L1I) 221, level one data cache (L1D) 222 and level two combined instruction/data cache (L2) 231 are formed on a single integrated circuit. This single integrated circuit preferably also includes auxiliary circuits such as power control circuit 241, emulation/trace circuits 242, design for test (DST) programmable built-in-self-test (PBIST) circuit 243 and clocking circuit 244. This single integrated circuit may also include memory controller 251.

Figure 3:
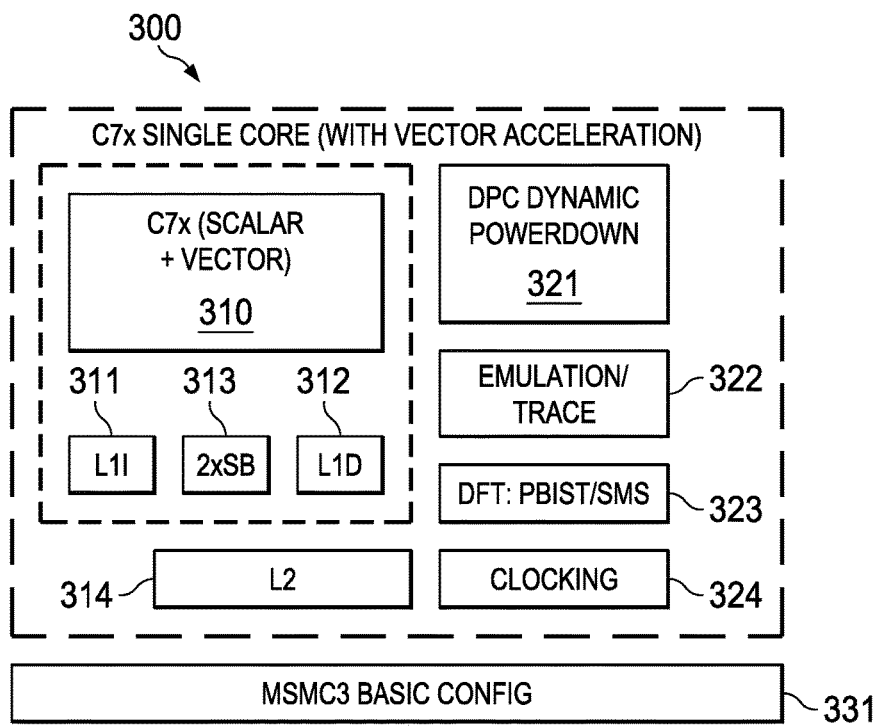
FIG. 3 illustrates a single core vector processor according to a further embodiment of this invention.
Figure 4:
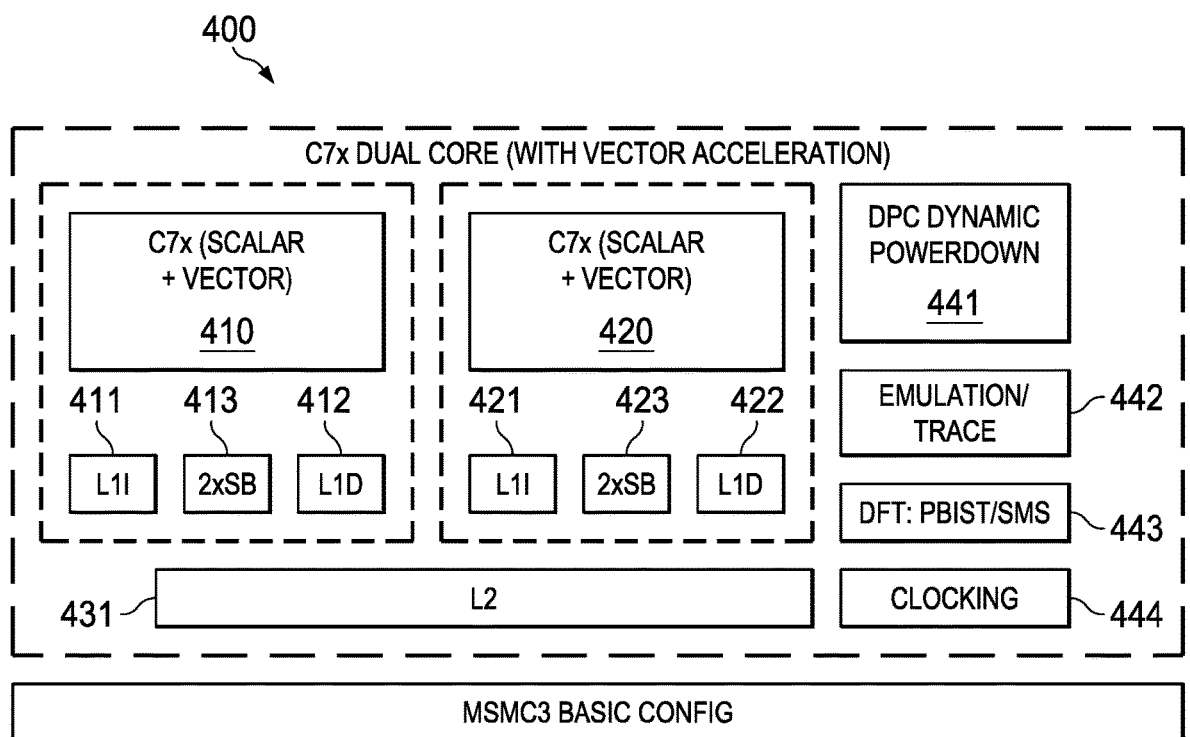
FIG. 4 illustrates a dual core vector processor according to a further embodiment of this invention.

FIGS. 3 and 4 illustrate single core and dual core processors similar to that shown respectively in FIGS. 1 and 2. FIGS. 3 and 4 differ from FIGS. 1 and 2 in showing vector central processing units, as further described below. Single core vector processor 300 includes a vector CPU 310. Dual core vector processor 400 includes two vector CPUs 410 and 420. Vector CPUs 310, 410 and 420 include wider data path operational units and wider data registers than the corresponding scalar CPUs 110, 210 and 220.

Figure 5:
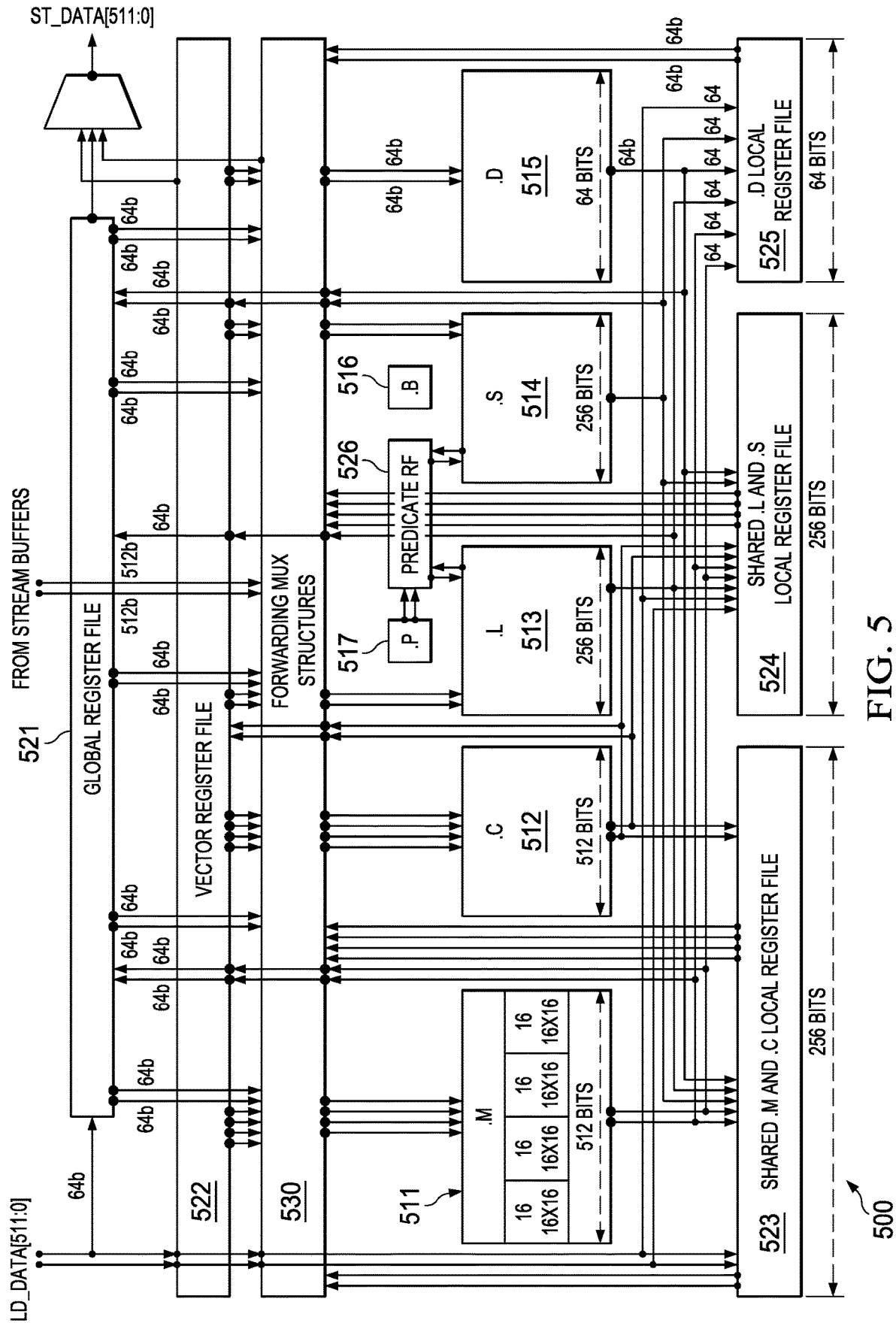
FIG. 5 illustrates construction of a central processing unit in accordance with an embodiment of this invention.

Vector CPUs 310, 410 and 420 further differ from the corresponding scalar CPUs 110, 210 and 220 in the inclusion of streaming engine 313 (FIG. 3) and streaming engines 413 and 423 (FIG. 5). Streaming engines 313, 413 and 423 are similar. Streaming engine 313 transfers data from level two unified cache 313 (L2) to a vector CPU 310. Streaming engine 413 transfers data from level two unified cache 431 to vector CPU 410. Streaming engine 423 transfers data from level two unified cache 431 to vector CPU 420. In accordance with the preferred embodiment each streaming engine 313, 413 and 423 manages up to two data streams.

Each streaming engine 313, 413 and 423 transfer data in certain restricted circumstances. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have fixed sequence of elements. Thus programs cannot seek randomly within the stream. The stream data is read-only while active. Programs cannot write to a stream while simultaneously reading from it. Once a stream is opened the streaming engine: calculates the address; fetches the defined data type from level two unified cache; performs data type manipulation such as zero extension, sign extension, data element sorting/swapping such as matrix transposition; and delivers the data directly to the programmed execution unit within the CPU. Streaming engines are thus useful for real-time digital filtering operations on well-behaved data. Streaming engines free these memory fetch tasks from the corresponding CPU enabling other processing functions.

The streaming engines provide the following benefits. They permit multi-dimensional memory accesses. They increase the available bandwidth to the functional units. They minimize the number of cache miss stalls since the stream buffer can bypass L1D cache. They reduce the number of scalar operations required in the loop to maintain. They manage the address pointers. They handle address generation automatically freeing up the address generation instruction slots and the .D unit for other computations.

FIG. 5 illustrates construction of one embodiment of the CPU of this invention. Except where noted this description covers both scalar CPUs and vector CPUs. The CPU embodiment depicted in FIG. 5 includes plural execution units multiply unit 511 (.M), correlation unit 512 (.C), arithmetic unit 513 (.L), arithmetic unit 514 (.S), load/store unit 515 (.D), branch unit 516 (.B) and predication unit 517 (.P). The operation and relationships of these execution units are detailed below.

Multiply unit 511 primarily performs multiplications. Multiply unit 511 accepts up to two double vector operands and produces up to one double vector result. Multiply unit 511 is instruction configurable to perform the following operations: various integer multiply operations, with precision ranging from 8-bits to 64-bits; various regular and complex dot product operations; and various floating point multiply operations; bit-wise logical operations; moves; as well as adds and subtracts. As illustrated in FIG. 5 multiply unit 511 includes hardware for four simultaneous 16 bit by 16 bit multiplications. Multiply unit 511 may access global scalar register file 521, global vector register file 522 and shared .M and C. local register 523 file in a manner described below. Forwarding multiplexer 530 mediates the data transfer between global scalar register file 521, global vector register file 522, the corresponding streaming engine and multiply unit 511.

Correlation unit 512 (.C) accepts up to two double vector operands and produces up to one double vector result. Correlation unit 512 supports these major operations. In support of WCDMA "Rake" and "Search" instructions correlation unit 512 performs up to 512 2-bit PN*8-bit I/Q complex multiplies per clock cycle. Correlation unit 512 performs 8-bit and 16-bit Sum-of-Absolute-Difference (SAD) calculations performing up to 512 SADs per clock cycle. Correlation unit 512 performs horizontal add and horizontal min/max instructions. Correlation unit 512 performs vector permutes instructions. Correlation unit 512 includes contains 8 256-bit wide control registers. These control registers are used to control the operations of certain correlation unit instructions. Correlation unit 512 may access global scalar register file 521, global vector register file 522 and shared .M and C. local register file 523 in a manner described below. Forwarding multiplexer 530 mediates the data transfer between global scalar register file 521, global vector register file 522, the corresponding streaming engine and correlation unit 512.

CPU 500 includes two arithmetic units: arithmetic unit 513 (.L) and arithmetic unit 514 (.S). Each arithmetic unit 513 and arithmetic unit 514 accepts up to two vector operands and produces one vector result. The compute units support these major operations. Arithmetic unit 513 and arithmetic unit 514 perform various single-instruction-multiple-data (SIMD) fixed point arithmetic operations with precision ranging from 8-bit to 64-bits. Arithmetic unit 513 and arithmetic unit 514 perform various compare and minimum/maximum instructions which write results directly to predicate register file 526 (further described below). Arithmetic unit 513 and arithmetic unit 514 perform various SIMD floating point arithmetic operations with precision ranging from half-precision (16-bits), single precision (32-bits) to double precision (64-bits). Arithmetic unit 513 and arithmetic unit 514 perform specialized instructions to speed up various algorithms and functions. Arithmetic unit 513 and arithmetic unit 514 may access global scalar register file 521, global vector register file 522, shared .L and S. local register file 524 and predicate register file 526 in a manner described below. Forwarding multiplexer 530 mediates the data transfer between global scalar register file 521, global vector register file 522, the corresponding streaming engine and arithmetic units 513 and 514.

Load/store unit 515 (.D) is primarily used for address calculations. Load/store unit 515 is expanded to accept scalar operands up to 64-bits and produces scalar result up to 64-bits. Load/store unit 515 includes additional hardware to perform data manipulations such as swapping, pack and unpack on the load and store data to reduce workloads on the other units. Load/store unit 515 can send out one load or store request each clock cycle along with the 44-bit physical address to level one data cache (L1D). Load or store data width can be 32-bits, 64-bits, 256-bits or 512-bits. Load/store unit 515 supports these major operations: 64-bit SIMD arithmetic operations; 64-bit bit-wise logical operations; and scalar and vector load and store data manipulations. Load/store unit 515 preferably includes a micro-TLB (table lookaside buffer) block to perform address translation from a 48-bit virtual address to a 44-bit physical address. Load/store unit 515 may access global scalar register file 521, global vector register file 522 and .D local register file 525 in a manner described below. Forwarding multiplexer 530 mediates the data transfer between global scalar register file 521, global vector register file 522, the corresponding streaming engine and load/store unit 515.

Branch unit 516 (.B) calculates branch addresses, performs branch predictions, and alters control flows dependent on the outcome of the prediction.

Predication unit 517 (.P) is a small control unit which performs basic operations on vector predication registers. Predication unit 517 has direct access to the vector predication registers 526. Predication unit 517 performs different bit operations on the predication registers such as AND, ANDN, OR, XOR, NOR, BITR, NEG, SET, BITCNT, RMBD, BIT Decimate and Expand, etc.

Figure 6:
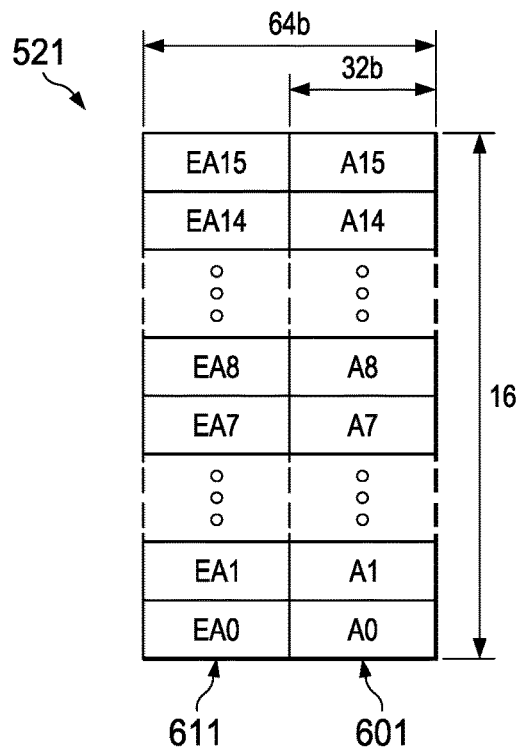
FIG. 6 illustrates a global scalar register file.

FIG. 6 illustrates global scalar register file 521. There are 16 independent 64-bit wide scalar registers. Each register of global scalar register file 521 can be read as 32-bits of scalar data (designated registers A0 to A15 601) or 64-bits of scalar data (designated registers EA0 to EA15 611). However, writes are always 64-bit, zero-extended to fill up to 64-bits if needed. All scalar instructions of all functional units can read from or write to global scalar register file 521. The instruction type determines the data size. Global scalar register file 521 supports data types ranging in size from 8-bits through 64-bits. A vector instruction can also write to the 64-bit global scalar registers 521 with the upper 192 bits of data of the vector being discarded. A vector instruction can also read 64-bit data from the global scalar register file 511. In this case the operand is zero-extended in the upper 192 bits to form an input vector.

Figure 7:
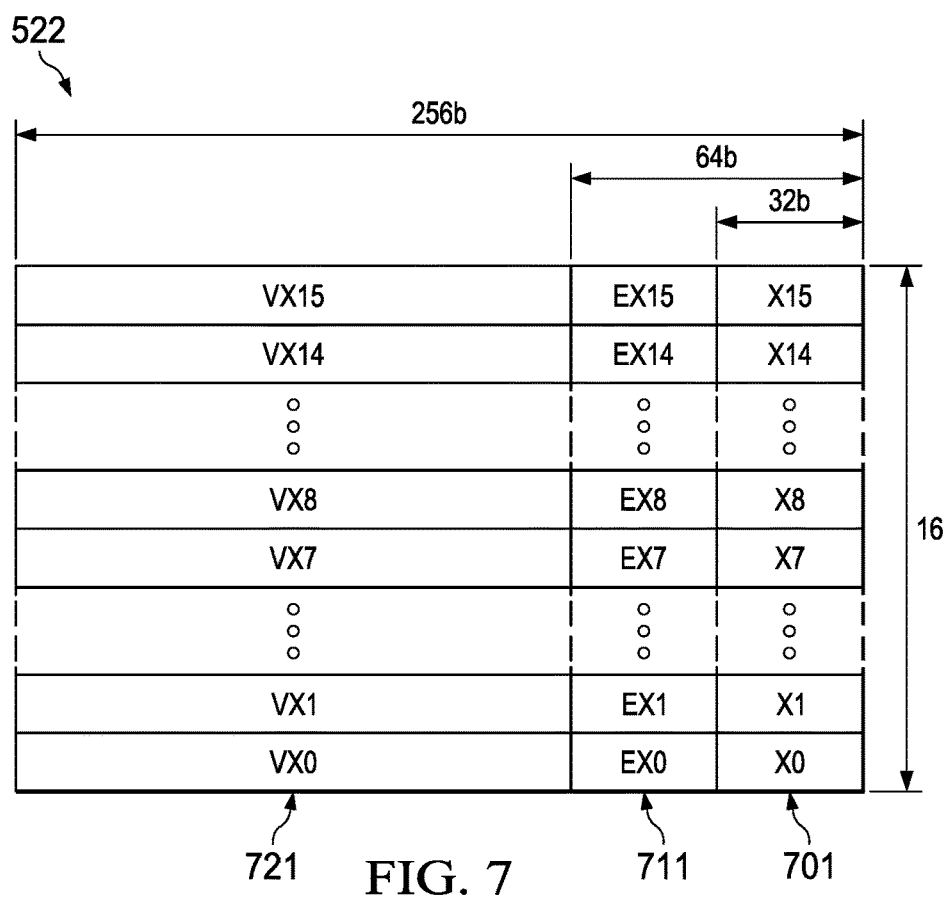
FIG. 7 illustrates a global vector register file.

FIG. 7 illustrates global vector register file 522. There are 16 independent 256-bit wide vector registers. Each register of global vector register file 522 can be read as 32-bits scalar data (designated registers X0 to X15 701), 64-bits of scalar data (designated registers EX0 to EX15 711), 256-bit vector data (designated registers VX0 to VX15 721) or 512-bit double vector data (designated DVX0 to DVX7, not illustrated). In the current embodiment, only multiply unit 511 and correlation unit 512 may execute double vector instructions. All vector instructions of all functional units can read or write to global vector register file 522. Any scalar instruction of any functional unit can also access the lower 32 or 64 bits of global vector register file 522 register for read or write. The instruction type determines the data size.

FIG. 8 illustrates local vector register file 523. There are 16 independent 256-bit wide vector registers. Each register of local vector register file 523 can be read as 32-bits scalar data (designated registers M0 to M15 801), 64-bits of scalar data (designated registers EM0 to EM15 811), 256-bit vector data (designated registers VEM0 to VEM15 821) or 512-bit double vector data (designated DVM0 to DVM7, not illustrated). In the current embodiment only multiply unit 511 and correlation unit 512 may execute double vector instructions. All vector instructions of all functional units can write to local vector register file 523. Only instructions of multiply unit 511 and correlation unit 512 may read from local vector register file 523. The instruction type determines the data size.

Multiply unit 511 may operate upon double vectors (512-bit data). Multiply unit 511 may read double vector data from and write double vector data to global vector register file 521 and local vector register file 523. Register designations DVXx and DVMx are mapped to global vector register file 521 and local vector register file 523 as follows.

TABLE 1

| Instruction Designation | Register Accessed |
| --- | --- |
| DVX0 | VX1:VX0 |
| DVX1 | VX3:VX2 |
| DVX2 | VX5:VX4 |
| DVX3 | VX7:VX6 |
| DVX4 | VX9:VX8 |
| DVX5 | VX11:VX10 |
| DVX6 | VX13:VX12 |
| DVX7 | VX15:VX14 |
| DVM0 | VM1:VM0 |
| DVM1 | VM3:VM2 |
| DVM2 | VM5:VM4 |
| DVM3 | VM7:VM6 |
| DVM4 | VM9:VM8 |
| DVM5 | VM11:VM10 |
| DVM6 | VM13:VM12 |
| DVM7 | VM15:VM14 |

Each double vector designation maps to a corresponding pair of adjacent vector registers in either global vector register 522 or local vector register 523. Designations DVX0 to DVX7 map to global vector register 522. Designations DVM0 to DVM7 map to local vector register 523.

Local vector register file 524 is similar to local vector register file 523. There are 16 independent 256-bit wide vector registers. Each register of local vector register file 524 can be read as 32-bits scalar data (designated registers L0 to L15), 64-bits of scalar data (designated registers EL0 to EL15) or 256-bit vector data (designated registers VL0 to VL15). All vector instructions of all functional units can write to local vector register file 524. Only instructions of arithmetic unit 513 and arithmetic unit 514 may read from local vector register file 524.

FIG. 9 illustrates local register file 525. There are 16 independent 64-bit wide registers. Each register of local register file 525 can be read as 32-bits of scalar data (designated registers D0 to D15 901) or 64-bits of scalar data (designated registers ED0 to ED15 911). All scalar and vector instructions of all functional units can write to local register file 525. Only instructions of load/store unit 515 may read from local register file 525. Any vector instructions can also write 64-bit data to local register file 525 with the upper 192 bits of data of the result vector discarded. Any vector instructions can also read 64-bit data from the 64-bit registers of the local register file 525. The return data is zero-extended in the upper 192 bits to form an input vector. The registers of local register file 525 can only be used as addresses in load/store instructions, not as store data or as sources for 64-bit arithmetic and logical instructions of load/store unit 515.

FIG. 10 illustrates the predicate register file 526. There are sixteen registers 32-bit registers in predicate register file 526. Predicate register file 526 contains the results from vector comparison operations and is used by vector selection instructions and vector predicated store instructions. A small subset of special instructions can also read directly from predicate registers, performs operations and write back to a predicate register directly. There are also instructions which can transfer values between the global register files (521 and 522) and predicate register file 526. Transfers between predicate register file 526 and local register files (523, 524 and 525) are not supported. Each bit of a predicate register (designated P0 to P15) controls a byte of a vector data. Since a vector is 256 bits in these embodiments, the width of a predicate register equals 256/8=32 bits. The predicate register file 526 can be written to by vector comparison operations to store the results of the vector compares. In an embodiment where a vector is 512 bits, such as described below in FIG. 15, the width of the predicate register equals 512/8=64 bits.

A CPU such as CPU 110, 210, 220, 310, 410 or 420 operates on an instruction pipeline. This instruction pipeline can dispatch up to nine parallel 32-bits slots to provide instructions to the seven execution units (multiply unit 511, correlation unit 512, arithmetic unit 513, arithmetic unit 514, load/store unit 515, branch unit 516 and predication unit 517) every cycle. Instructions are fetched instruction packets of fixed length, as further described below. All instructions require the same number of pipeline phases for fetch and decode, but may require a varying number of execute phases.

Figure 11:
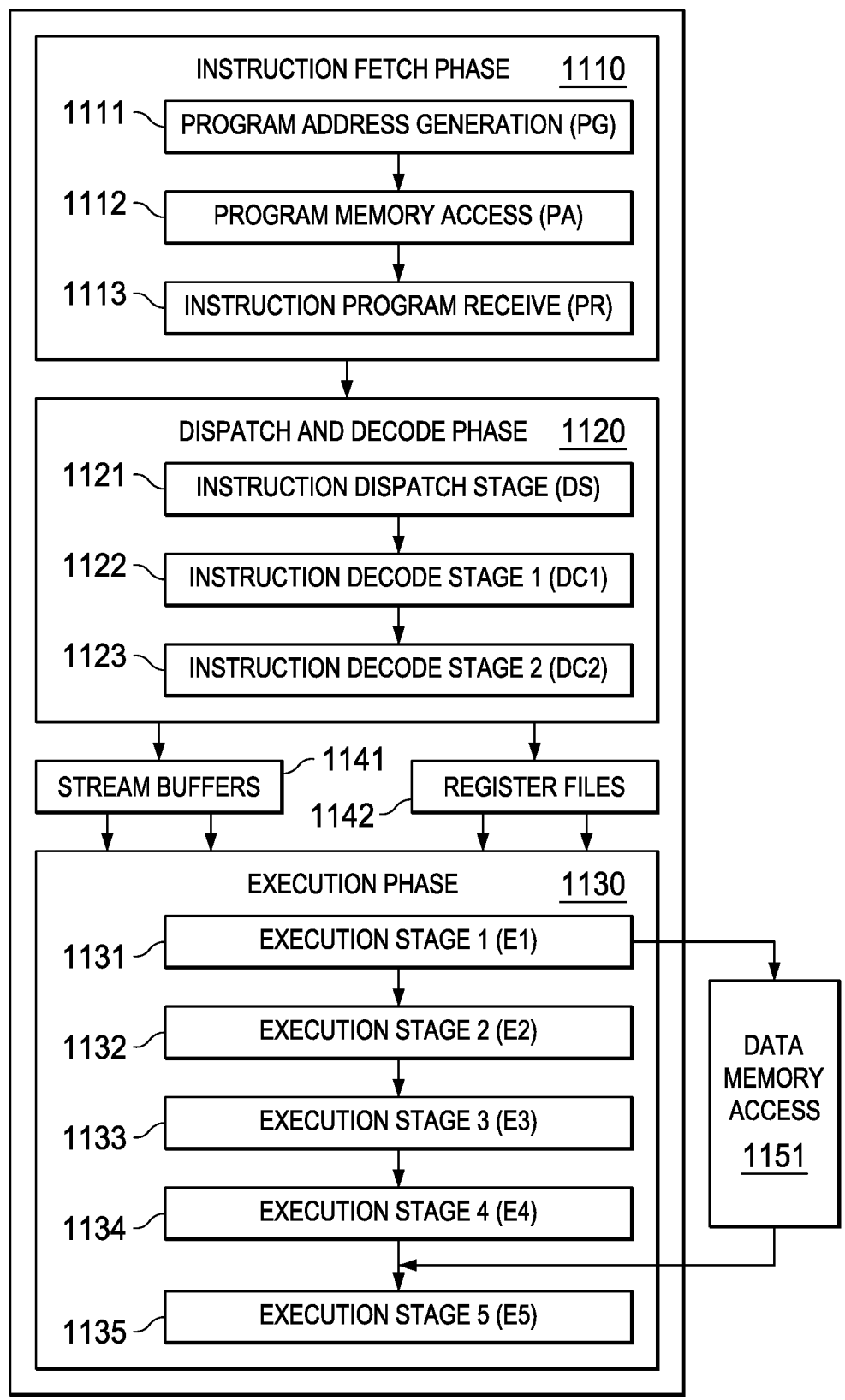
FIG. 11 illustrates pipeline phases of a central processing unit according to an embodiment of this invention.

FIG. 11 illustrates the following pipeline phases: program fetch phase 1110, dispatch and decode phases 1120 and execution phases 1130. Program fetch phase 1110 includes three stages for all instructions. Dispatch and decode phases 1120 include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache L1I. During the program access stage 1112 (PA) the level one instruction cache L1I processes the request, accesses the data in its memory and sends a fetch packet to the CPU boundary. During the program receive stage 1113 (PR) the CPU registers the fetch packet.

Figure 12:
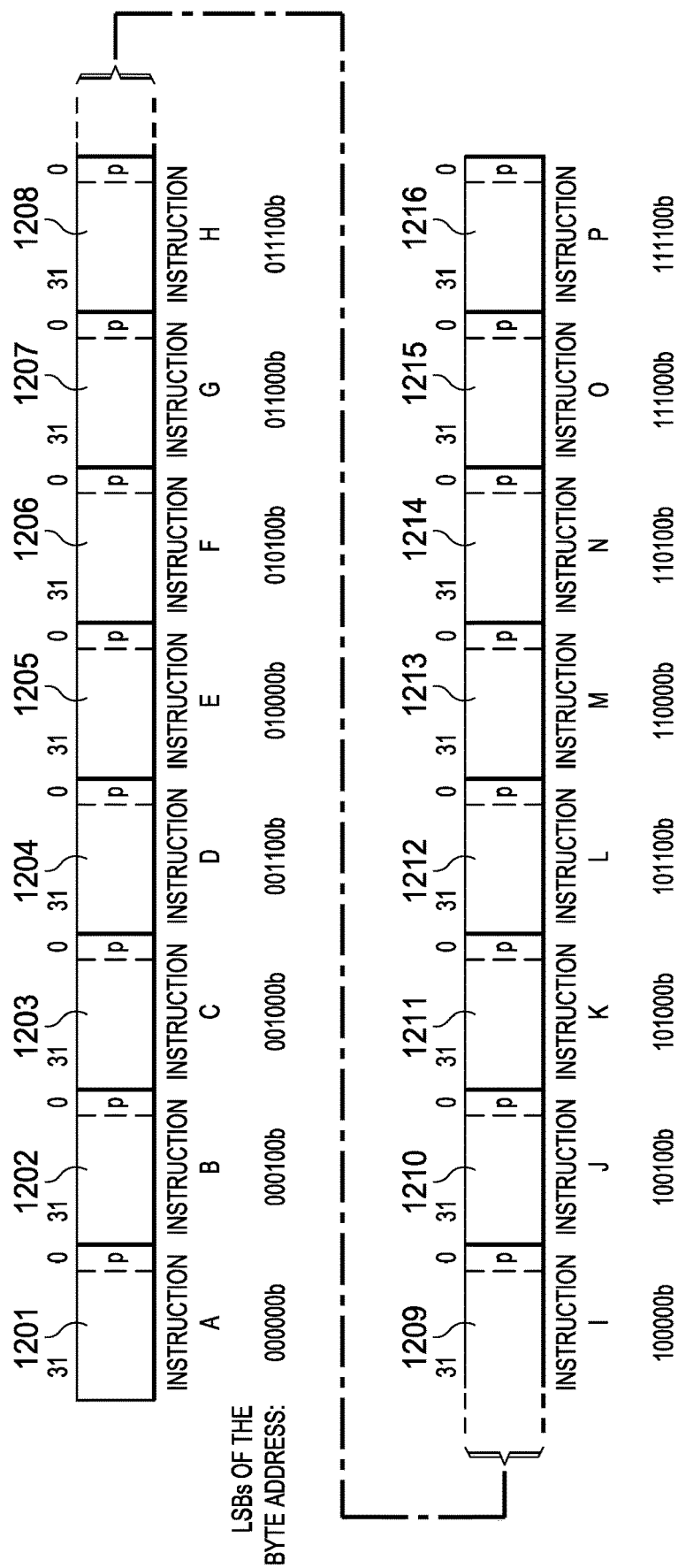
FIG. 12 illustrates sixteen instructions of a single fetch packet.

Instructions are fetched sixteen words at a time in one embodiment. FIG. 12 illustrates this fetch packet. FIG. 12 illustrates 16 instructions 1201 to 1216 of a single fetch packet. Fetch packets are aligned on 512-bit (16-word) boundaries. The execution of the individual instructions is partially controlled by a p bit in each instruction. This p bit is preferably bit 0 of the instruction. The p bit determines whether the instruction executes in parallel with another instruction. The p bits are scanned from lower to higher address. If the p bit of an instruction is 1, then the next following instruction is executed in parallel with (in the same cycle as) that instruction. If the p bit of an instruction is 0, then the next following instruction is executed in the cycle after the instruction. All instructions executing in parallel constitute an execute packet. An execute packet can contain up to nine instructions. Each instruction in an execute packet must use a different functional unit. An execute packet can contain up to nine 32-bit wide slots. A slot can either be a self-contained instruction or expand the constant field specified by the immediate preceding instruction. A slot can be used as conditional codes to apply to the instructions within the same fetch packet. A fetch packet can contain up to 2 constant extension slots and one condition code extension slot.

There are up to 11 distinct instruction slots, but scheduling restrictions limit to 9 the maximum number of parallel slots. The maximum nine slots are shared as follows: multiply unit 511; correlation unit 512; arithmetic unit 513; arithmetic unit 514; load/store unit 515; branch unit 516 shared with predicate unit 517; a first constant extension; a second constant extension; and a unit-less instruction shared with a condition code extension. The last instruction in an execute packet has a p bit equal to 0.

The CPU and level one instruction cache L1I pipelines are de-coupled from each other. Fetch packet returns from level one instruction cache L1I can take different number of clock cycles, depending on external circumstances such as whether there is a hit in level one instruction cache L1I. Therefore program access stage 1112 (PA) can take several clock cycles instead of 1 clock cycle as in the other stages.

Dispatch and decode phases 1120 include instruction dispatch to appropriate execution unit stage 1121 (DS), instruction pre-decode stage 1122 (DC1); and instruction decode, operand reads stage 1123 (DC2). During instruction dispatch to appropriate execution unit stage 1121 (DS) the fetch packets are split into execute packets and assigned to the appropriate functional units. During the instruction pre-decode stage 1122 (DC1), the source registers, destination registers, and associated paths are decoded for the execution of the instructions in the functional units. During the instruction decode, operand reads stage 1123 (DC2), more detailed unit decodes are done, as well as reading operands from the register files.

Execution phases 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG phase 1111 is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the CPU boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

Figure 13:
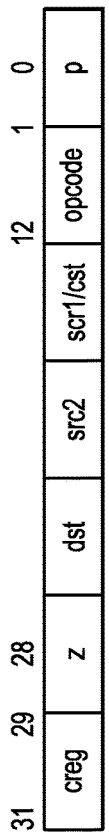
FIG. 13 illustrates an example of instruction coding of instructions.

FIG. 13 illustrates an example of the instruction coding of instructions used by this invention. Each instruction consists of 32 bits and controls the operation of one of the individually controllable functional units (multiply unit 511, correlation unit 512, arithmetic unit 513, arithmetic unit 514, load/store unit 515). The bit fields are defined as follows. The creg field and the z bit are optional fields used in conditional instructions. These bits are used for conditional instructions to identify the predicate register and the condition. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field and the z field are encoded in the instruction as shown in Table 2.

TABLE 2

| Conditional | creg | | | z |
|---|---|---|---|---|
| Register | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |
| A4 | 1 | 0 | 1 | z |
| A5 | 1 | 1 | 0 | z |
| Reserved | 1 | 1 | x | x |

Note that "z" in the z bit column refers to the zero/not zero comparison selection noted above and "x" is a don't care state. This coding can only specify a subset of the 16 global scalar registers as predicate registers. This selection was made to preserve bits in the instruction coding. Note that unconditional instructions do not have these optional bits. For unconditional instructions these bits (28 to 31) are preferably used as additional opcode bits. However, if needed, an execute packet can contain a unique 32-bit condition code extension slot which contains the 4-bit CREGZ fields for the instructions which are in the same execute packet. Table 3 shows the coding of such a condition code extension slot.

TABLE 3

| Bits | Functional Unit |
|---|---|
| 3:0 | .L |
| 7:4 | .S |
| 11:5 | .D |
| 15:12 | .M |
| 19:16 | .C |
| 23:20 | .B |
| 28:24 | Reserved |
| 31:29 | Reserved |

Thus the condition code extension slot specifies bits decoded in the same way the creg/z bits assigned to a particular functional unit in the same execute packet.

The dst field specifies a register in a corresponding register file as the destination of the instruction results.

The scr2 field specifies a register in a corresponding register file as the second source operand.

The scr1/cst field has several meanings depending on the instruction opcode field (bits 1 to 12 and additionally bits 28 to 31 for unconditional instructions). The first meaning specifies a register of a corresponding register file as the first operand. The second meaning is an immediate constant. Depending on the instruction type, this is treated as an unsigned integer and zero extended to a specified data length or is treated as a signed integer and sign extended to the specified data length.

The opcode field (bits 1 to 12 for all instructions and additionally bits 28 to 31 for unconditional instructions) specifies the type of instruction and designates appropriate instruction options. This includes designation of the functional unit and operation performed. A detailed explanation of the opcode is beyond the scope of this invention except for the instruction options detailed below.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

One implementation of a register file set is comprised of the following components:

Global Scalar Register File (GRF) 521 shown in FIG. 6. All scalar instructions can read and write this register file.

Global Vector Register File (VRF) 522 shown in FIG. 7. All vector and double vector instructions can read and write to this register file. Furthermore, all scalar instructions can also access the lower 32 or 64 bits of this register file as a source or a destination.

Local Vector Register File (LRF) 523 shown in FIG. 8. This register file is local to the functional units, and can only be read by its corresponding functional unit(s). However, it can be written by any functional unit. Similar to the VRF, any scalar instructions can also access the lower 32 or 64 bits of a LRF register as a source or a destination.

Scalar and vector registers are mapped to the same portion of physical registers, with one common global register set but many overlapping local register sets.

Global registers contain data which can be shared by all execution units, i.e. can be read from and written to by all execution units.

Local registers are owned by the corresponding execution unit(s). A local register can only be read by its own execution unit. However, any execution unit can write to local registers of other execution units.

Dedicated predicate registers 1001 of predicate register file 526 shown in FIG. 10 stores predicate values.

By allowing overlapping of scalar and vector registers, the number of total registers needed is minimized/reduced, which also allows compiler flexibilities in mixing scalar and vector instructions.

Distinguishing between local and global registers also helps reduce register pressure for storing results, as does minimizing the number of read ports required for the local registers by restricting read access to its own execution unit only.

Dedicated predicate registers reduce register pressure by storing predication value separately instead of in general registers. This also helps reduce critical paths by allowing the predicate registers to be physically placed next to the predicate unit.

What is claimed is:

1. A processing device comprising:
a global register file that includes an output;
a data forwarding structure coupled to the output of the global register file;
a set of arithmetic units that each includes a respective input coupled to the data forwarding structure and a respective output;
a multiply unit that includes an input coupled to the data forwarding structure in parallel with the set of arithmetic units and an output;
a first local register file coupled to:
the respective output of each arithmetic unit of the set of arithmetic units to receive write data of a first width from a respective arithmetic unit;
the output of the multiply unit to receive write data of the first width from the multiply unit; and
the data forwarding structure to provide a first set of read data of the first width to the data forwarding structure; and
a second local register file coupled to:
the respective output of each arithmetic unit of the set of arithmetic units to receive write data of the first width from the respective arithmetic unit;
the output of the multiply unit to receive write data of a second width from the multiply unit, wherein the second width is different from the first width; and
the data forwarding structure to provide a second set of read data of the second width to the data forwarding structure,
wherein the data forwarding structure is configured to:
couple the output of the global register file to the set of arithmetic units and the multiply unit; and
couple the first local register file to the set of arithmetic units and couple the second local register file to the multiply unit respectively such that the set of arithmetic units is permitted to read the first set of read data from the first local register file and not the second set of read data from the second local register file and the multiply unit is permitted to read the second set of read data from the second local register file and not the first set of read data from the first local register file.

2. The processing device of claim 1, wherein the multiply unit is a vector multiply unit and is configured to receive a set of vector operands from the second local register file.

3. The processing device of claim 1, wherein the global register file is further coupled to the respective output of each arithmetic unit of the set of arithmetic units and the output of the multiply unit.

4. The processing device of claim 1, wherein:
the global register file is configured to provide a third set of read data; and
the data forwarding structure is configured to provide the third set of read data to any of the set of arithmetic units or the multiply unit.

5. The processing device of claim 4, wherein a width of the third set of read data is less than the second width of the second set of read data.

6. The processing device of claim 1, wherein the multiply unit is a vector multiply unit and is configured to receive a set of vector operands from a combination of the second local register file and the global register file.

7. The processing device of claim 1, wherein:
the global register file is a scalar register file; and
each of the first local register file and the second local register file is a vector register file.

8. The processing device of claim 1, wherein each of the global register file, the first local register file, and the second local register file is a vector register file.

9. The processing device of claim 1 further comprising:
a correlation unit that includes an input coupled to the data forwarding structure in parallel with the multiply unit, wherein:
the correlation unit includes an output coupled to the first local register file and the second local register file; and
the data forwarding structure is configured to couple the first local register file to the set of arithmetic units such that the correlation unit is not permitted to receive the first set of read data from the first local register file.

10. The processing device of claim 1 further comprising:
a load store unit that includes an input coupled to the data forwarding structure in parallel with the multiply unit, wherein the load store unit includes an output; and
a third local register file coupled to:
the respective output of each arithmetic unit of the set of arithmetic units to receive write data from the respective arithmetic unit;
the output of the multiply unit to receive write data from the multiply unit;
the output of the load store unit to receive write data from the load store unit; and
the data forwarding structure to provide a third set of read data, wherein the data forwarding structure is configured to couple the third local register file to the load store unit such that the multiply unit and the set of arithmetic units are not permitted to receive the third set of read data from the third local register file.

11. The processing device of claim 10, wherein the third local register file has a width that is less than the second width of the second local register file.

12. A processing device comprising:
a global register file that includes an output;
a data forwarding structure that includes: a global register file input coupled to the output of the global register file, a first local register file input, a second local register file input, a set of arithmetic unit outputs, and a multiply unit output;
a set of arithmetic units that each includes a respective input coupled to a respective output of the set of arithmetic unit outputs of the data forwarding structure, and a respective output;
a multiply unit that includes an input coupled to the multiply unit output of the data forwarding structure and an output;
a first local register file that includes:
a multiply unit input coupled to the output of the multiply unit;
a set of arithmetic unit inputs each coupled to the respective output of an arithmetic unit of the set of arithmetic units; and
an output coupled to the first local register file input of the data forwarding structure to provide a first set of read data of a first width; and
a second local register file that includes:
a multiply unit input coupled to the output of the multiply unit;

a set of arithmetic unit inputs each coupled to the respective output of an arithmetic unit of the set of arithmetic units; and an output coupled to the second local register file input of the data forwarding structure to provide a second set of read data of a second width, wherein the second width of the second set of read data is different from the first width of the first set of read data, wherein the data forwarding structure is configured to:

couple the output of the global register file to the set of arithmetic units and the multiply unit; and couple the first local register file to the set of arithmetic units and couple the second local register file to the multiply unit respectively such that the set of arithmetic units is permitted to read the first set of read data from the first local register file and not the second set of read data from the second local register file and the multiply unit is permitted to read the second set of read data from the second local register file and not the first set of read data from the first local register file.

13. The processing device of claim 12, wherein the multiply unit is a vector multiply unit and is configured to receive a set of vector operands from the second local register file.

14. The processing device of claim 12, wherein the global register file includes:

an output coupled to the global register file input of the data forwarding structure;

a set of inputs each coupled to the respective output of an arithmetic unit of the set of arithmetic units; and an input coupled to the output of the multiply unit.

15. The processing device of claim 12, wherein the multiply unit is a vector multiply unit and is configured to receive a set of vector operands from a combination of the second local register file and the global register file.

16. The processing device of claim 12, wherein:

the global register file is a scalar register file; and the second local register file is a vector register file.

17. The processing device of claim 12, wherein each of the global register file and the second local register file is a vector register file.

18. The processing device of claim 12, wherein:

the data forwarding structure further includes a correlation unit output;

the second local register file includes a correlation unit input;

the processing device further comprises a correlation unit that includes an input coupled to the correlation unit output of the data forwarding structure and an output coupled to the correlation unit input of the second local register file; and the data forwarding structure is configured to couple the second local register file to the correlation unit.

19. The processing device of claim 18, wherein:

the data forwarding structure further includes a load store unit output and a load store register file input;

the second local register file includes a load store unit input; and the processing device further comprises:

a load store unit that includes an input coupled to the load store unit output of the data forwarding structure and an output coupled to the load store unit input of the second local register file; and a load store register file that includes:

a multiply unit input coupled to the output of the multiply unit;

a set of arithmetic unit inputs each coupled to the respective output of an arithmetic unit of the set of arithmetic units;

a load store unit input coupled to the output of the load store unit; and an output coupled to the load store register file input of the data forwarding structure.

20. The processing device of claim 19, wherein the data forwarding structure is configured to couple the load store register file to the load store unit such that: the set of arithmetic units, the multiply unit, and the correlation unit are not permitted to read from the load store register file.

* * * * *